United States Patent
Ohsumi et al.

(10) Patent No.: US 11,148,610 B2
(45) Date of Patent: Oct. 19, 2021

(54) IN-VEHICLE IMAGE CAPTURING DEVICE

(71) Applicant: Hitachi Automotive Systems, Ltd., Hitachinaka (JP)

(72) Inventors: Ken Ohsumi, Hitachinaka (JP); Hidenori Shinohara, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 0 days.

(21) Appl. No.: 16/488,204

(22) PCT Filed: Mar. 19, 2018

(86) PCT No.: PCT/JP2018/010702
§ 371 (c)(1),
(2) Date: Aug. 22, 2019

(87) PCT Pub. No.: WO2018/180665
PCT Pub. Date: Oct. 4, 2018

(65) Prior Publication Data
US 2019/0381953 A1    Dec. 19, 2019

(30) Foreign Application Priority Data

Mar. 28, 2017 (JP) .............................. JP2017-063683

(51) Int. Cl.
*B60R 11/04* (2006.01)
*G03B 11/04* (2021.01)
*B60R 11/00* (2006.01)

(52) U.S. Cl.
CPC ............ *B60R 11/04* (2013.01); *G03B 11/045* (2013.01); *B60R 2011/0026* (2013.01)

(58) Field of Classification Search
CPC ............ B60R 11/04; B60R 2011/0026; G03B 11/045; G03B 17/561
See application file for complete search history.

(56) References Cited

U.S. PATENT DOCUMENTS

| 4,213,589 A | 7/1980 | Pierron et al. |
| 10,556,551 B2 * | 2/2020 | Krug .................... F16M 13/02 |

(Continued)

FOREIGN PATENT DOCUMENTS

| DE | 11 2013 001 708 T5 | 12/2014 |
| JP | S48-8604 U1 | 1/1973 |

(Continued)

OTHER PUBLICATIONS

Office Action issued in corresponding Japanese Patent Application No. 2017-063683 dated Oct. 4, 2019.

(Continued)

*Primary Examiner* — Peter D Le
(74) *Attorney, Agent, or Firm* — Foley & Lardner LLP

(57) ABSTRACT

The present invention provides an in-vehicle image capturing device which can be mounted on window glass of a vehicle without involving deterioration in precision of installation. The in-vehicle imaging device is characterized by comprising an image capturing unit which captures an image, and a holding part which includes a shielding section for partially shielding the imaging unit and which holds the image capturing unit, wherein: the holding part is bonded to window glass in advance; the image capturing unit includes a supported section which is supported by the holding part; and the holding part includes a guiding section for guiding the supported section toward a first direction in which the image capturing unit approaches the shielding section, and a supporting section for supporting the supported section and for restricting movement, in the first direction, of the supported section that has been guided by the guiding section.

11 Claims, 6 Drawing Sheets

(56) References Cited

U.S. PATENT DOCUMENTS

| | | | |
|---|---|---|---|
| 2005/0001901 A1* | 1/2005 | Eggers | B60R 11/04 348/118 |
| 2009/0122141 A1* | 5/2009 | Nakamura | B60R 11/04 348/148 |
| 2010/0321497 A1* | 12/2010 | Onishi | B60R 1/10 348/148 |
| 2012/0207461 A1 | 8/2012 | Okuda | |
| 2013/0335624 A1* | 12/2013 | Barthel | H04N 5/2251 348/373 |
| 2014/0055617 A1* | 2/2014 | Minikey, Jr. | B60R 11/00 348/148 |
| 2014/0160284 A1* | 6/2014 | Achenbach | B60R 11/04 348/143 |
| 2014/0226012 A1* | 8/2014 | Achenbach | B60R 11/04 348/148 |
| 2014/0246868 A1* | 9/2014 | Corwin | E05B 77/04 292/7 |
| 2014/0313337 A1* | 10/2014 | Devota | B60R 11/04 348/148 |
| 2015/0042804 A1 | 2/2015 | Okuda | |
| 2015/0097013 A1* | 4/2015 | Rawlings | B60R 1/12 224/567 |
| 2015/0251605 A1* | 9/2015 | Uken | H04N 5/2257 248/467 |
| 2015/0256729 A1* | 9/2015 | Wato | G03B 17/02 348/311 |
| 2015/0274089 A1* | 10/2015 | Schutz | H04N 5/2252 224/567 |
| 2015/0353024 A1* | 12/2015 | Cooper | B60S 1/0848 348/148 |
| 2016/0006911 A1* | 1/2016 | Kimura | H04N 5/2252 348/47 |
| 2016/0023620 A1 | 1/2016 | Matori | |
| 2016/0119509 A1* | 4/2016 | Wato | G03B 17/55 348/148 |
| 2016/0227078 A1* | 8/2016 | Oh | H04N 5/374 |
| 2016/0307953 A1* | 10/2016 | Kono | H04N 5/2252 |
| 2017/0217382 A1* | 8/2017 | Gunes | H04N 5/2252 |

FOREIGN PATENT DOCUMENTS

| | | |
|---|---|---|
| JP | S53-108772 U1 | 8/1978 |
| JP | S54-049453 A | 4/1979 |
| JP | 2004-052877 A | 2/2004 |
| JP | 2007-31077 A | 2/2007 |
| JP | 2012-144115 A | 8/2012 |
| JP | 2012-166615 A | 9/2012 |
| JP | 2013-144475 A | 7/2013 |
| JP | 2016-203772 A | 12/2016 |
| WO | WO-2013/146352 A1 | 10/2013 |
| WO | WO-2014/141357 A1 | 9/2014 |

OTHER PUBLICATIONS

Office Action issued in corresponding Japanese Patent Application No. 2017-063683 dated May 30, 2019.

International Search Report with English translation and Written Opinion issued in corresponding application No. PCT/JP2018/010702 dated Jul. 3, 2018.

Extended European Search Report issued in corresponding European Application No. 18776799.1 dated Sep. 10, 2020.

* cited by examiner

IN-VEHICLE IMAGE CAPTURING DEVICE

TECHNICAL FIELD

The present invention relates to an in-vehicle image capturing device which is mounted in a vehicle and can capture an image of an area around the vehicle.

BACKGROUND ART

Conventionally, an in-vehicle system, which recognizes an object by calculating a distance to the object by triangulation using an image obtained by capturing an image of the object by a pair of cameras, has been known. Particularly, in an in-vehicle environment, since there is an application demand for detection of another vehicle, a pedestrian, an obstruction, or the like in front of the in-vehicle system to secure safety in advance, it is necessary to certainly implement a distance measurement and recognition of a remote object.

In such an in-vehicle system, a dedicated LSI (integrated circuit), which specifies a pixel position of a feature point common to a pair of images based on pixel information included in the images and calculates the number of pixels (hereinafter, referred to as "parallax") by which the feature point is misaligned in the pair of images, is generally mounted. Therefore, it is ideal that there is no misalignment other than the parallax between the pair of images, and a structure, which can perform adjustment with high precision so that there is no deviation in optical characteristics or signal characteristics to thereby retain precision, is required for each camera which captures each of the pair of images. Furthermore, in order to improve a performance of detection of a preceding vehicle or the like, it is necessary to obtain a correct feature point common to a pair of images. To this end, it is preferable that a luminance value of a feature point of a reference camera is equivalent to that of another camera making a pair with the reference camera.

Since the characteristics described above are required, it is required for a structure for mounting an in-vehicle camera in a vehicle to be able to be fixed at a predetermined position. For example, in the invention described in JP 2012-166615 A, in a structure in which a bracket is bonded to a windshield of a vehicle in advance and an in-vehicle camera is mounted on the bracket, the in-vehicle camera is mounted and fixed while pressing a leaf spring which urges the in-vehicle camera in a direction perpendicular to a surface of the windshield.

CITATION LIST

Patent Literature

PTL 1: JP 2012-166615 A

SUMMARY OF INVENTION

Technical Problem

It is preferable that an in-vehicle camera is fixed to a window glass of a vehicle so as to be able to capture an image of the outside while being provided inside the vehicle. As for a process of mounting the in-vehicle camera in a vehicle assembly process, a time required to reach a process of mounting the in-vehicle camera to a window glass is shorter than a time required for a process in which the window glass is bonded and fixed to a vehicle body portion of a vehicle and an adhesive therefor is completely hardened. Therefore, in order to efficiently perform the vehicle assembly process, a method of mounting the in-vehicle camera to the window glass in an unstable state in which the adhesive between the window glass and the vehicle body portion is not completely hardened can be considered.

However, in the structure described in JP 2012-166615 A, the window glass is pushed by the in-vehicle camera in the direction perpendicular to the surface of the window glass at the time of mounting the in-vehicle camera. In this case, since a large load is applied to the window glass, there is a possibility that a positional relation between the window glass and the vehicle body portion is broken in a state in which the adhesive between the window glass and the vehicle main body is not completely hardened, which results in deterioration in precision of installation.

An object of the present invention is to provide an in-vehicle image capturing device which can be mounted on a window glass of a vehicle without involving deterioration in precision of installation.

Solution to Problem

In order to achieve the object described above, the present invention provides an in-vehicle image capturing device including: an image capturing unit which captures an image; and a holding part which includes a shielding section for partially shielding the image capturing unit and which holds the image capturing unit, wherein the image capturing unit includes a supported section which is supported by the holding part, and the holding part includes a guiding section for guiding the supported section toward a first direction in which the image capturing unit approaches the shielding section, and a supporting section for supporting the supported section and for restricting movement, in the first direction, of the supported section that has been guided by the guiding section.

Advantageous Effects of Invention

According to the present invention, it is possible to provide the in-vehicle image capturing device which can be mounted on a window glass of a vehicle without involving deterioration in precision of installation.

Problems, configurations, and effects other than those described above will become apparent by the following description of embodiments.

DESCRIPTION OF EMBODIMENTS

Hereinafter, an in-vehicle image capturing device according to the present invention will be described with reference to the drawings.

Embodiment 1

Figure 1:
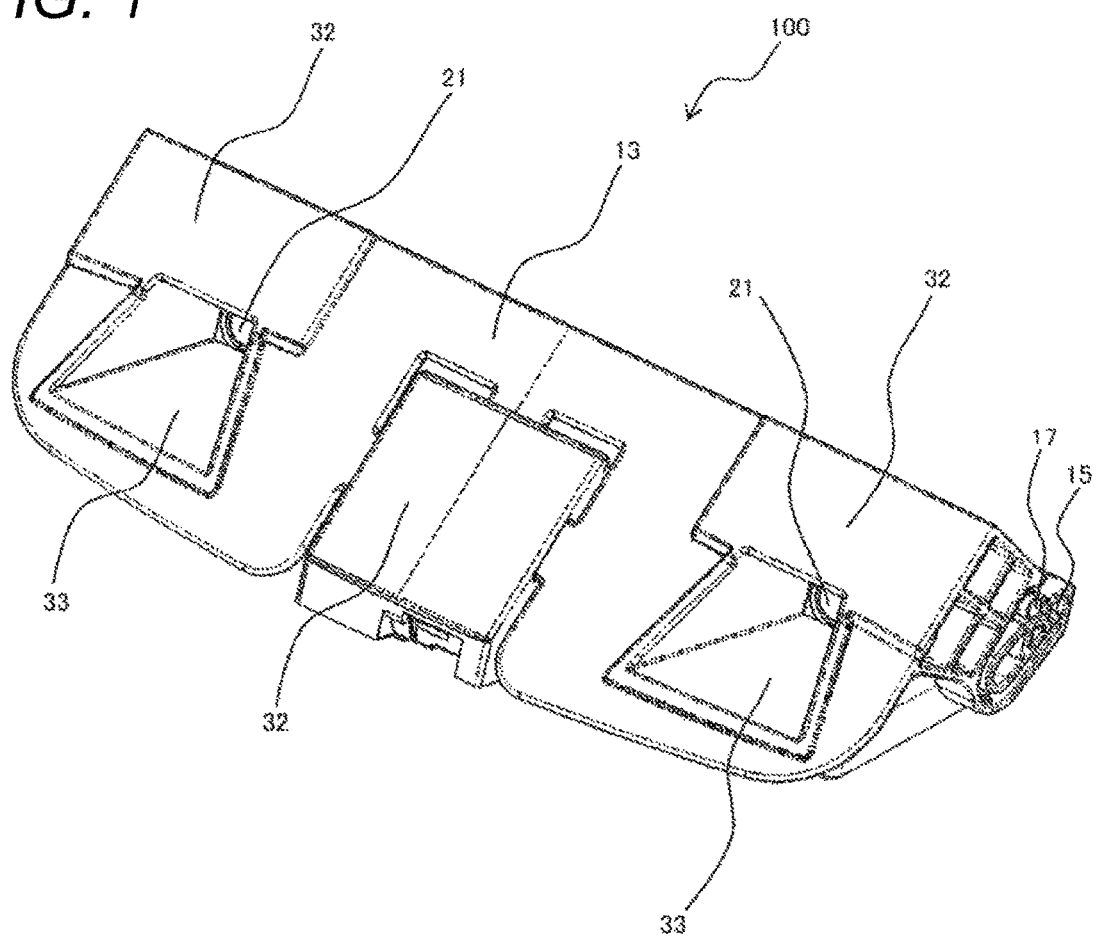
FIG. 1 is a perspective view of an in-vehicle image capturing device 100 according to Embodiment 1 of the present invention.

FIG. 1 is a perspective view of an in-vehicle image capturing device 100 according to Embodiment 1 of the present invention.

Figure 2:
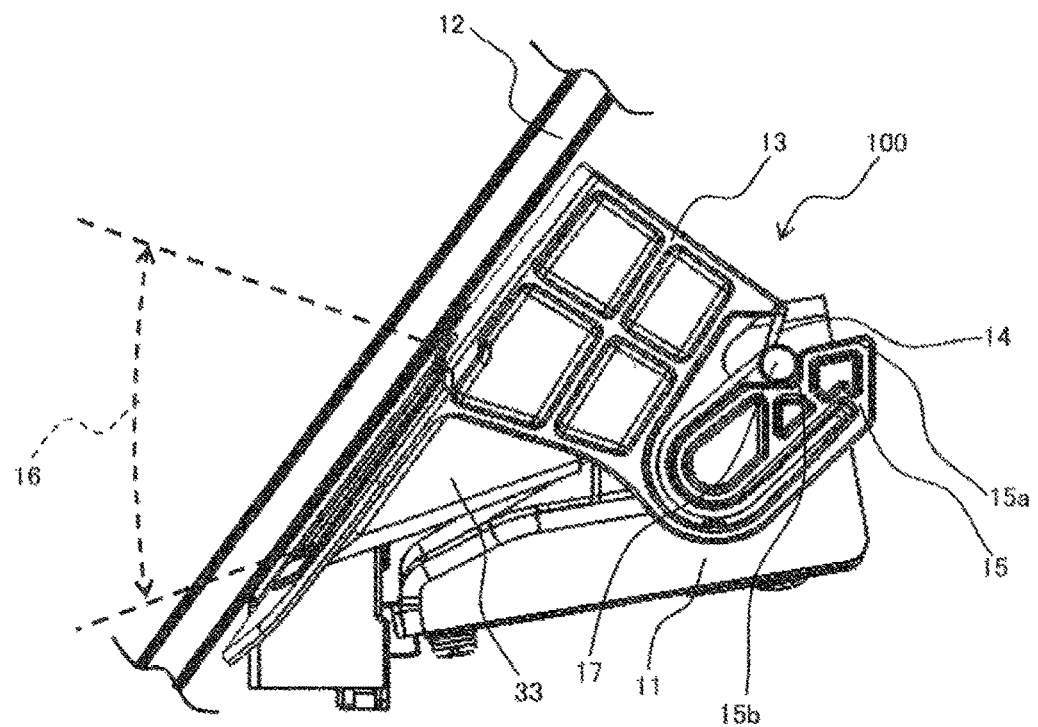
FIG. 2 is a side view of the in-vehicle image capturing device 100 illustrated in FIG. 1.

FIG. 2 is a side view of the in-vehicle image capturing device 100 illustrated in FIG. 1.

The in-vehicle image capturing device 100 according to the present embodiment includes a bracket 13 and an in-vehicle camera 11.

As illustrated in FIG. 1, the bracket 13 of the in-vehicle image capturing device 100 has a bond surface 32 on an upper surface thereof and is bonded to a window glass 12 by an adhesive applied onto the bond surface 32. Furthermore, bond means other than the adhesive may be used. For example, the bracket 13 may be bonded to the window glass 12 by an adhesive tape.

In a process of assembling a vehicle 40 (illustrated in FIG. 8 below), the bracket 13 of the in-vehicle image capturing device 100, from which the in-vehicle camera 11 is removed, is bonded to the window glass 12 at the bond surface 32 in advance, and the window glass 12 to which the bracket 13 is bonded is bonded to a vehicle body 41 (illustrated in FIG. 8 below). Thereafter, the in-vehicle camera 11 is mounted on the bracket 13 bonded to the window glass 12. The in-vehicle camera 11 is fixed through the bracket 13 in order to be bonded to the window glass 12.

Figure 3:
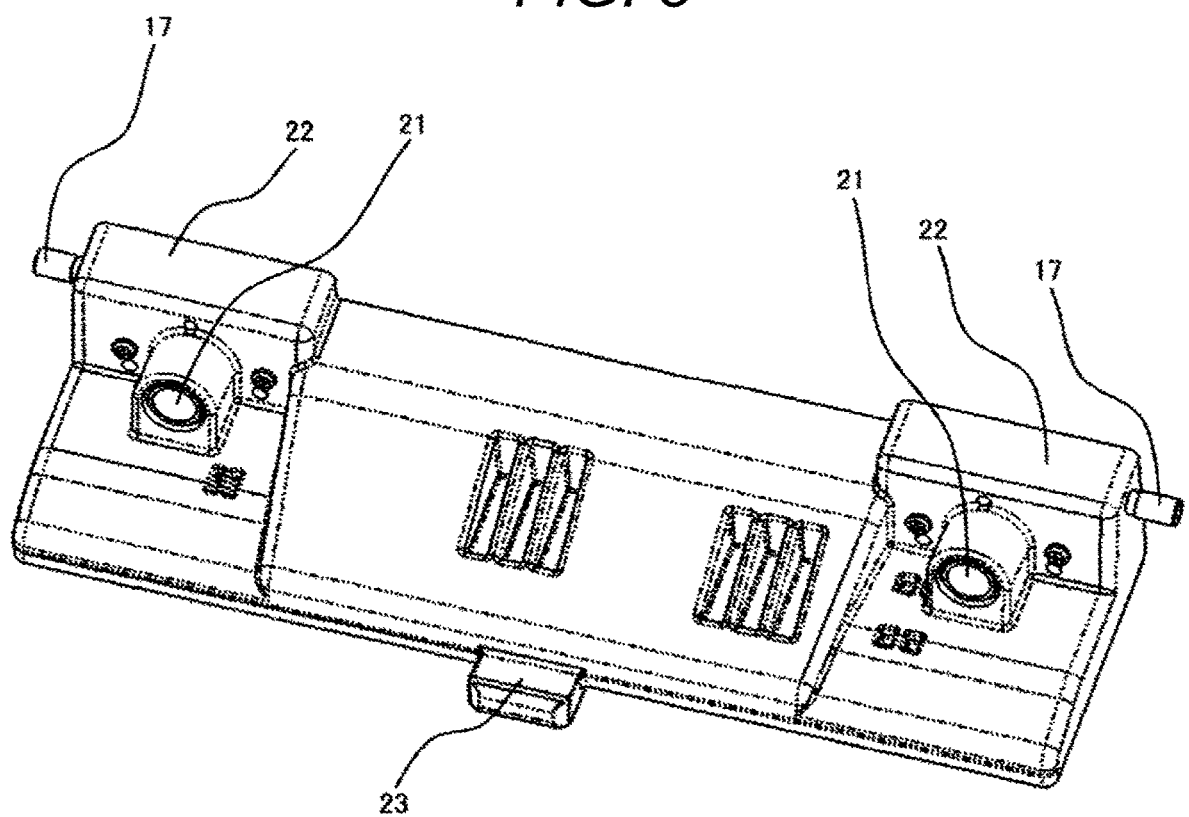
FIG. 3 is a perspective view of an in-vehicle camera 11 illustrated in FIGS. 1 and 2.

FIG. 3 is a perspective view of the in-vehicle camera 11 illustrated in FIGS. 1 and 2.

The in-vehicle camera 11 includes two camera units 22 each of which can capture an image through a lens 21. The camera unit 22 includes an image capturing element (not illustrated) such as a charge coupled device (CCD) or a complementary metal oxide semiconductor (CMOS), and captures an image through the lens 21 and a cavity portion of a lens hood 33 as illustrated in FIG. 1. Furthermore, as illustrated in FIG. 2, the lens hood 33 can prevent light that is out of an image capturing range 16 from being incident on the camera unit 22.

Note that although two camera units 22 are provided in the present embodiment, the present invention is not limited thereto. The present invention can also be applied to an in-vehicle image capturing device including one camera unit or an in-vehicle image capturing device including three or more camera units.

The in-vehicle camera 11 includes an LSI (integrated circuit) (not illustrated), and the LSI performs an analysis with respect to an external area, such as recognition of an object or calculation of a distance to the object by using an image captured by the camera unit 22.

The image captured by the camera unit 22 or an analysis result obtained by the LSI is output to the outside by an external output unit (wired or wireless) (not illustrated) in the in-vehicle camera 11 and is used for a control of the vehicle 40.

Shaft portions 17 are provided at opposite ends of the in-vehicle camera 11 and a protruding portion 23 is provided at the front side of the center of the in-vehicle camera 11. The in-vehicle camera 11 is mounted on the bracket 13 by the shaft portions 17 at the opposite ends and the protruding portion 23. That is, the in-vehicle camera 11 is supported with respect to the bracket 13 at three points including the shaft portions 17 at the opposite ends and the protruding portion 23. By the three-point supporting, a posture direction of the in-vehicle camera 11 is determined and an image capturing range of the camera unit 22 is fixed.

Figure 4:
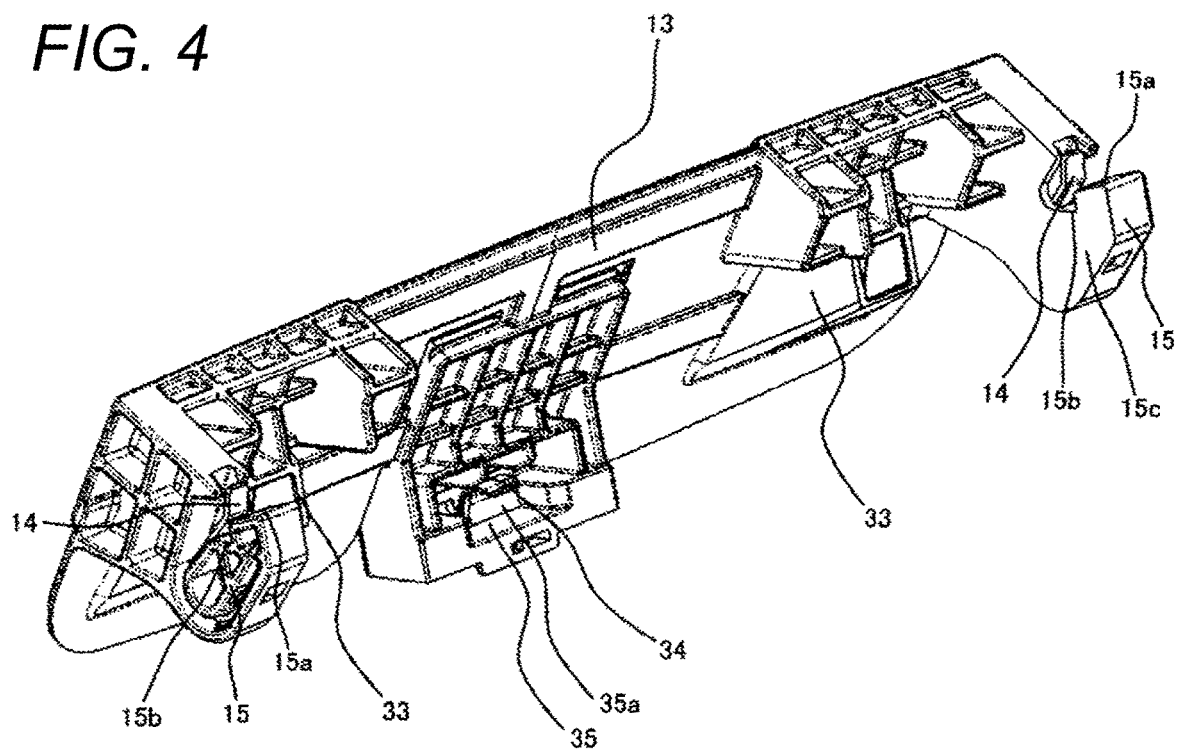
FIG. 4 is a perspective view of a bracket 13 illustrated in FIGS. 1 and 2.

FIG. 4 is a perspective view of the bracket 13 illustrated in FIGS. 1 and 2 and is a view when viewed from the upper right side of FIG. 1.

Receiving portions 15 are provided at opposite ends of the bracket 13 and a receiving portion 35 is provided at the back side of the center of the bracket 13. The receiving portion 35 receives the protruding portion 23 when the in-vehicle camera 11 is mounted, and the two receiving portions 15 receive the two shaft portions 17, respectively, when the in-vehicle camera 11 is mounted.

The in-vehicle camera 11 is mounted on the bracket 13 by being moved obliquely downward (moved in a direction to make the lens 21 approach the lens hood 33) along a direction of a surface of the window glass 12 (substantially parallel to the surface of the window glass 12, that is, the bond surface 32). The receiving portion 35 includes a recess portion 35a into which the protruding portion 23 is fitted, and a leaf spring 34. The leaf spring 34, which is an elastic body, is pressed by the protruding portion 23 and thus is deformed when the protruding portion 23 is fitted into the recess portion 35a, and holds and fixes the protruding portion 23 by a restoring force against the deformation.

Next, structures of the shaft portion 17 and the receiving portion 15 will be described in detail.

Figure 5:
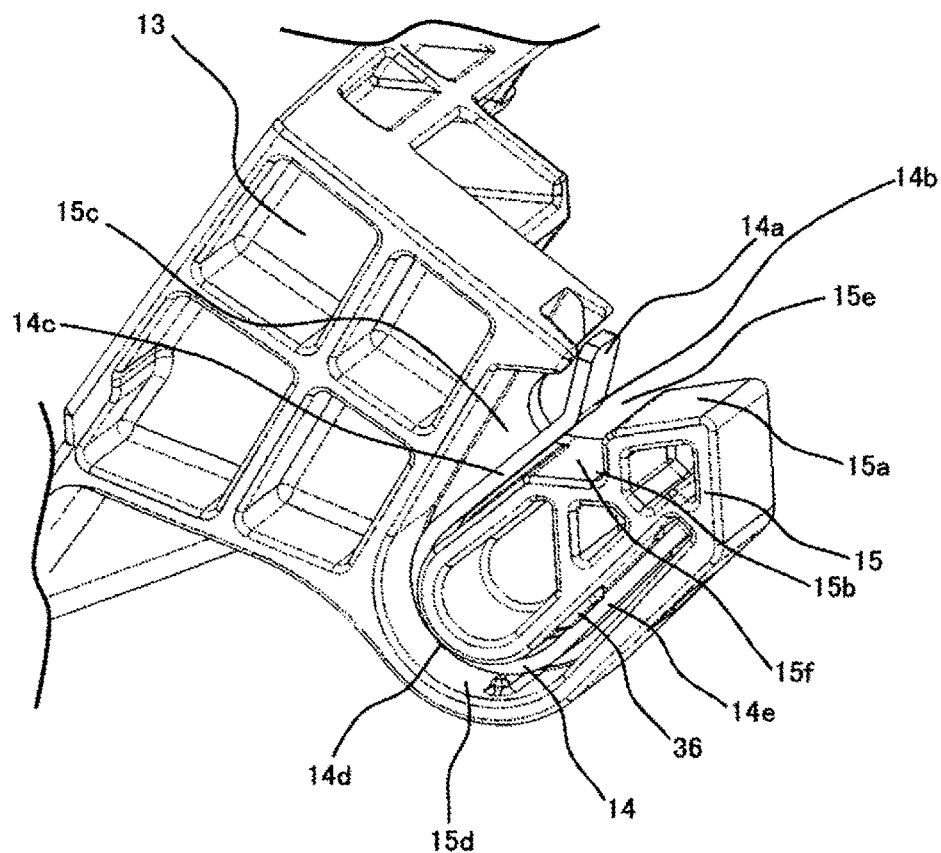
FIG. 5 is an enlarged perspective view of one of two receiving portions 15.

FIG. 5 is an enlarged perspective view of one (the receiving portion 15 of the left side in FIG. 4) of two receiving portions 15.

Figure 6:
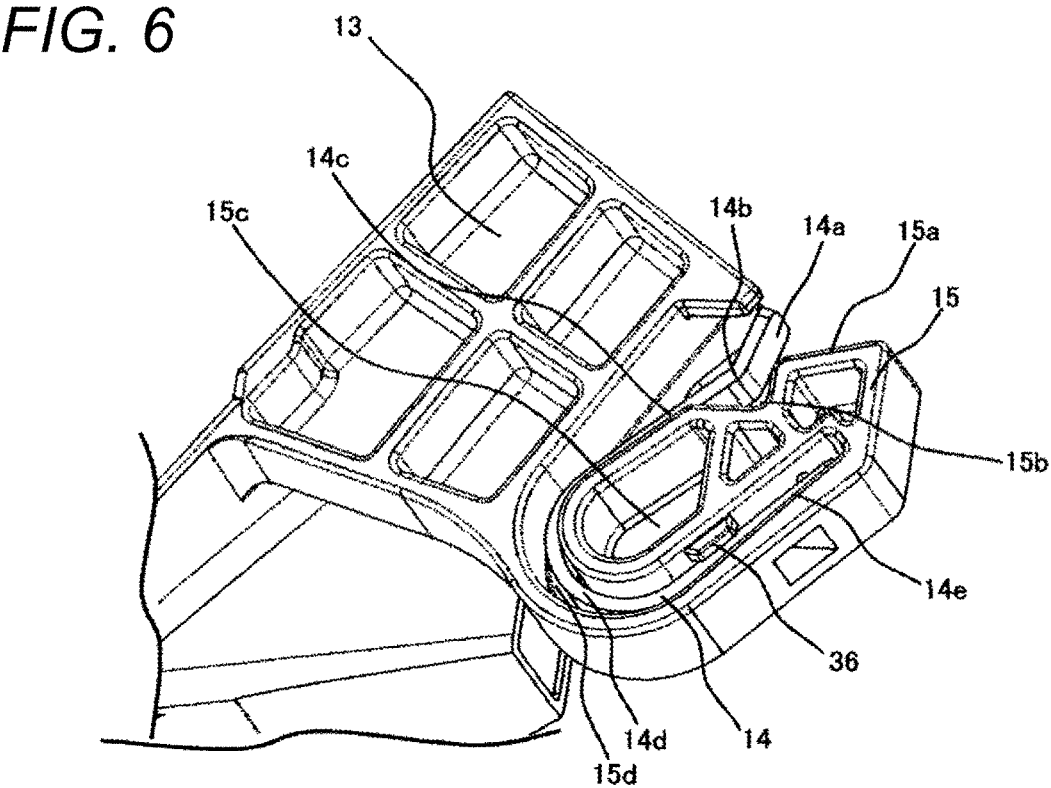
FIG. 6 is a perspective view of the receiving portion 15 of FIG. 5 when viewed from below.

FIG. 6 is a perspective view of the receiving portion 15 of FIG. 5 when viewed from below.

The receiving portion 15 includes a wall portion 15c at an inner side thereof as can be seen from the receiving portion 15 of the right side in FIG. 4 and includes a groove portion 15d having a U-letter shape at an outer side thereof as can be seen from the receiving portion 15 (the receiving portion 15 of FIGS. 5 and 6) of the left side in FIG. 4. A bottom of the groove portion 15d is the wall portion 15c. A leaf spring 14 having a cross section with a U-letter shape corresponding to the U-letter shape of the groove portion 15d is fitted into the groove portion 15d. The receiving portion 15 includes a stopper portion 36 and the leaf spring 14, which is an elastic body fitted into the groove portion 15d, is fitted between the wall portion 15c and the stopper portion 36 so as not to fall out from the groove portion 15d. The stopper portion 36 may be provided in plural. As a plurality of stopper portions 36 are provided, an effect of preventing the leaf spring 14 from falling out is further improved. The leaf spring 14 can also be integrally molded with the receiving portion 15. However, in the present embodiment, the leaf spring 14 is formed separately from the receiving portion 15, the receiving portion 15 is formed of, for example, a resin, and the leaf spring 14 is, for example, a metal leaf spring.

A guiding surface 15a is provided at an upper side of the receiving portion 15, and a guiding surface 14a of the leaf spring 14 is positioned at a position facing the guiding surface 15a. An opening portion 15e is formed between the guiding surface 15a and the guiding surface 14a.

The guiding surface 14a which is one end of the leaf spring 14 is bent at a bent portion 14b, an angle of the guiding surface 14a is adjusted by the bending, and the shaft portion 17 is guided to easily enter into the opening portion 15e by the angle of the guiding surface 14a and an angle of the guiding surface 15a.

The leaf spring 14 includes a linear portion 14c extending from the guiding surface 14a through the bent portion 14b and includes a linear portion 14e which is the other end of the leaf spring 14 and extends from a curved portion 14d. An end portion of the linear portion 14e extends beyond a position of the stopper portion 36 up to a position corresponding to a position of the bent portion 14b in a vertical direction of the U-letter shape.

When trying to make the shaft portion 17 enter into the opening portion 15e, a U-letter shaped opening of the leaf spring 14 widens and an elastic force of the leaf spring 14 presses the shaft portion 17 toward the receiving portion 15. Once the shaft portion 17 passes through the opening portion 15e, the shaft portion 17 reaches a space portion 15f. The space portion 15f is a space formed between the leaf spring 14 and an abutting portion 15b. The abutting portion 15b consists of two surfaces at a substantially right angle. The shaft portion 17 reaching the space portion 15f is supported at three points including the two surfaces of the abutting portion 15b, and the leaf spring 14. Further, the shaft portion 17 is pressed toward the abutting portion 15b by the restoring force against the deformation of the leaf spring 14, thus is held and fixed.

In the present embodiment, the abutting portion 15b includes two surfaces including a surface forming an angle of about 45 degrees with respect to the linear portion 14c of the leaf spring 14, and a surface forming an angle of about 135 degrees with respect to the linear portion 14c of the leaf spring 14. However, the present invention is not limited thereto, and the two surfaces may be at an angle other than the right angle.

Next, a structure of the leaf spring 34 of the receiving portion 35 illustrated in FIG. 4 will be described.

Figure 7:
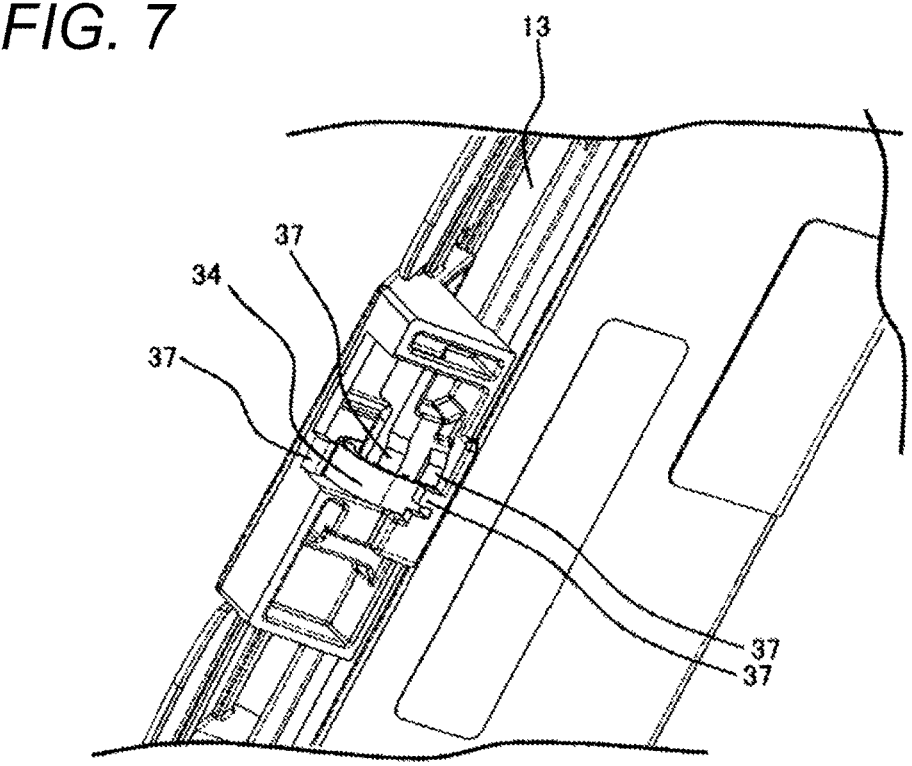
FIG. 7 is a perspective view of a receiving portion 35 illustrated in FIG. 4 when viewed from the back side of FIG. 4.

FIG. 7 is a perspective view of the receiving portion 35 illustrated in FIG. 4 when viewed from the back side of FIG. 4.

The receiving portion 35 includes a stopper portion 37. The stopper portion 37 presses a leaf spring 34 to prevent the leaf spring 34 from falling out. In FIG. 7, the stopper portion 37 is provided in plural.

As a plurality of stopper portions 37 are provided, an effect of preventing the leaf spring 34 from falling out is further improved.

Figure 8:
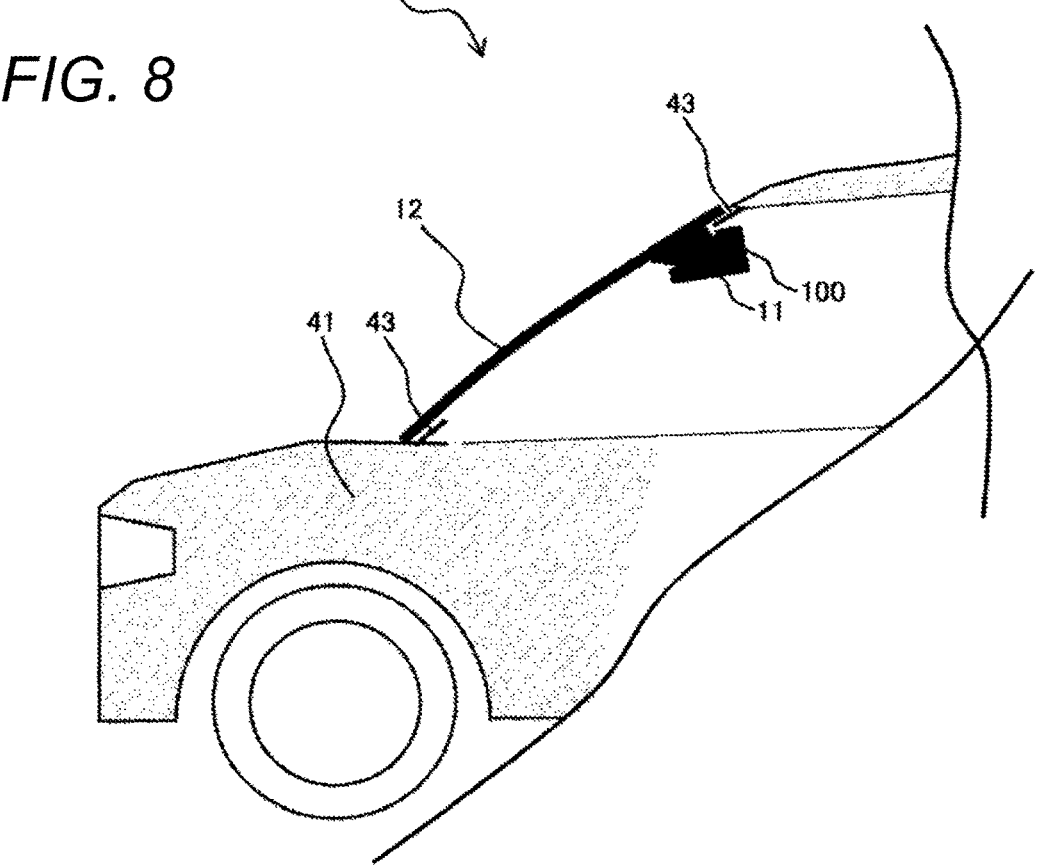
FIG. 8 is a schematic side view of a vehicle 40, illustrating a state in which the in-vehicle image capturing device 100 illustrated in FIG. 1 is mounted in the vehicle 40.

FIG. 8 is a schematic side view of the vehicle 40, illustrating a state in which the in-vehicle image capturing device 100 illustrated in FIG. 1 is mounted in the vehicle 40.

As for a mounting order, generally, the window glass 12 is mounted on the vehicle body 41 before the in-vehicle camera 11 is. The window glass 12 and a bond portion 43 of the vehicle body 41 are generally fixed by an adhesive. The bonding and mounting of the window glass 12 and the in-vehicle camera 11 are performed as described above. It is preferable that the in-vehicle camera 11 is disposed at an upper portion of the window glass 12 so as not to disturb a visual field of a driver as illustrated in FIG. 8.

As described above, the bracket 13 includes the lens hood 33, such that light that is out of the image capturing range 16 of the in-vehicle camera 11 is not incident on the camera unit 22. A positional relation between the lens hood 33 and the camera unit 22 is illustrated in FIG. 9.

Figure 9:
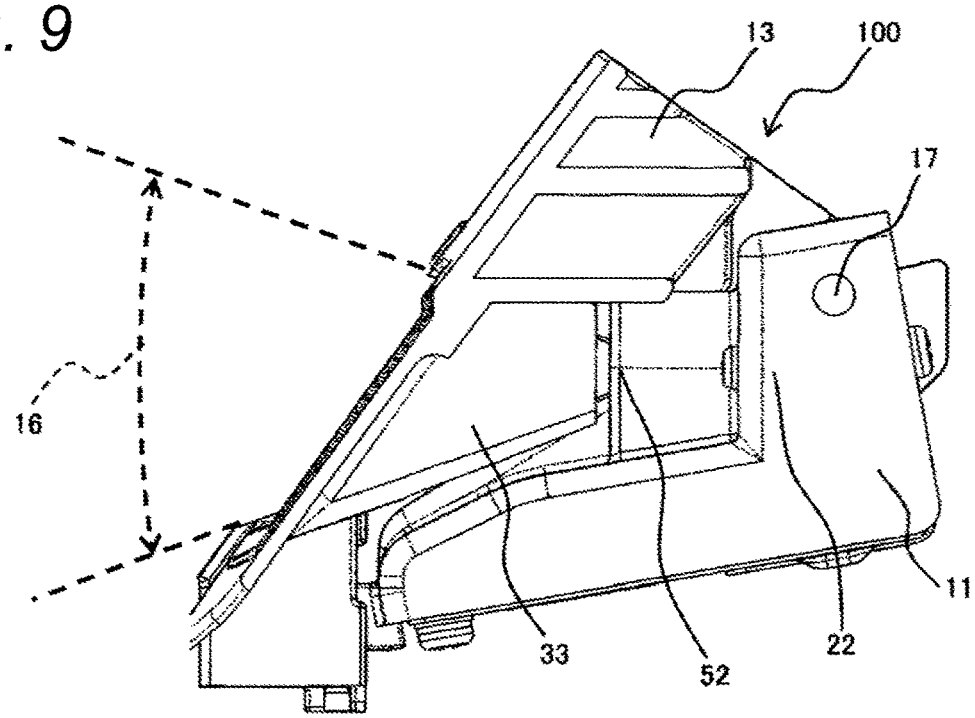
FIG. 9 is a side view in which an area in the vicinity of the receiving portion 15 is omitted from the side view of FIG. 2 so that a lens hood 33 can be seen.

FIG. 9 is a side view in which an area in the vicinity of the receiving portion 15 is omitted from the side view of FIG. 2 so that the lens hood 33 can be seen.

In a case of considering designability, it is preferable that the lens hood 33 and a distal end portion 52 of the camera unit 22 can be installed adjacent to each other. As the lens hood 33 and the distal end portion 52 of the camera unit 22 are installed adjacent to each other, it is possible to cover and conceal portions other than the lens 21 when the in-vehicle image capturing device 100 is viewed from the outside of the vehicle.

(Others)

The bracket 13 includes the receiving portion 15 and the leaf spring 14 as a guiding section for determining a mounting direction of the in-vehicle camera 11. As an opening of the guiding section is provided so that a direction in which the shaft portion 17 moves from the guiding section to a position where the shaft portion 17 is to be held is parallel to the window glass 12 as much as possible (so that a line connecting between the opening portion 15e and the space portion 15f is parallel to the surface of the window glass 12 as much as possible), a direction of a load applied at the time of mounting the in-vehicle camera 11 also becomes in parallel to the window glass 12, such that a load applied in a direction in which the window glass 12 is separated from the vehicle body 41 becomes small. As a result, it is possible to mount the in-vehicle camera 11 while retaining the positional relation between the window glass 12 and the vehicle body 41 as it is.

The leaf spring 14 is mounted at an angle at which a load is applied in a direction away from the window glass 12 as illustrated in FIG. 2. For example, in a case where a direction in which the shaft portion 17 passes through the guiding section is parallel to the window glass 12, it is preferable that a direction of a load applied to the shaft portion 17 in the space portion 15f is perpendicular to the surface of the window glass 12. However, the window glass 12 and the direction of the applied load may not be completely perpendicular to each other.

It is preferable that reference surfaces (two surfaces of the abutting portion 15b) of the bracket 13 are provided axisymmetrically to each other with respect to the direction of the load applied to the shaft portion 17 in the space portion 15f. However, the reference surfaces of the bracket 13 may not be completely axisymmetrical to each other.

In a case where the mounting direction of the shaft portion 17, in which the shaft portion 17 moves from the opening portion 15e to the space portion 15f, forms a larger angle with respect to the ground in comparison to that of the window glass 12, a load applied to the window glass 12 can be further decreased. As a result, the shaft portion 17 passing through the opening portion 15e finally moves in a direction away from the window glass 12 by the leaf spring 14, and is clamped and fixed between the leaf spring 14 and the reference surfaces (two surfaces of the abutting portion 15b) of the bracket 13. In this case, a force is not applied in the direction in which the window glass 12 is separated from the vehicle body 41 not only at the time of mounting, but also at the time of fixing the shaft portion 17 in the space portion 15*f*, such that it is possible to retain the positional relation between the window glass 12 and the vehicle body 41.

The leaf spring which urges the shaft portion 17 in the space portion 15*f* may be formed of a material different from that of the receiving portion of the bracket 13, but may also be formed of the same material. For example, the receiving portion and the leaf spring may be formed of a plastic material. Further, another elastic body other than the leaf spring may also be used.

In order to clamp and fix the shaft portion 17 and the abutting portion 15*b* in a U-letter shaped cross section of the leaf spring 14, one end of the leaf spring 14 is in contact with the shaft portion 17, and the other end of the leaf spring 14 has a length so that a contact point between the leaf spring 14 and the receiving portion 15 is positioned on an extension of a line connecting a contact point between the leaf spring 14 and the shaft portion 17 and the center of the shaft portion 17 to each other.

Embodiment 2

Figure 10:
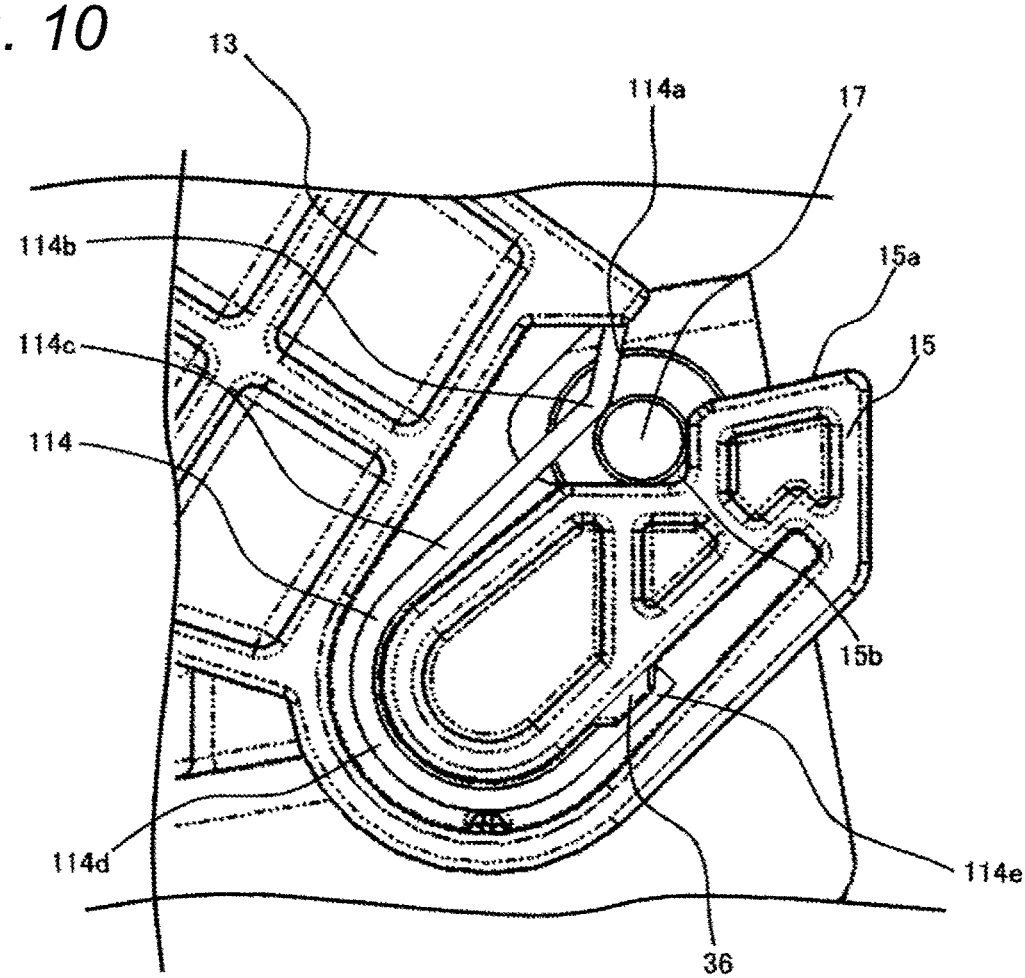
FIG. 10 is an enlarged side view of an area in the vicinity of a receiving portion of a bracket of an in-vehicle image capturing device according to Embodiment 2 of the present invention.

FIG. 10 is an enlarged side view of an area in the vicinity of a receiving portion of a bracket of an in-vehicle image capturing device according to Embodiment 2 of the present invention.

The present embodiment is the same as Embodiment 1 except for a configuration described with reference to FIG. 10, and thus a description thereof will be omitted.

In FIG. 10, a leaf spring 114 is provided instead of the leaf spring 14 of Embodiment 1. A guiding surface 15*a* is provided at an upper side of a receiving portion 15, and a guiding surface 114*a* of the leaf spring 114 is positioned at a position facing the guiding surface 15*a*.

The leaf spring 14 includes a linear portion 114*c* extending from the guiding surface 114*a*, which is one end of the leaf spring 114, through a bent portion 114*b* and includes a linear portion 114*e* which is the other end of the leaf spring 114 and extends from a curved portion 114*d*.

An end portion of the linear portion 114*e* extends up to a position substantially the same as a position of a stopper portion 36.

In other words, in the present embodiment, the one end of the leaf spring 114 is in contact with a shaft portion 17, and the other end of the leaf spring 114 has a length not long enough to reach an extension connecting a contact point between the leaf spring 114 and the shaft portion 17, and the center of the shaft portion 17 to each other.

In the present invention, the leaf spring 114 having such a shape may be used.

Embodiment 3

Figure 11:
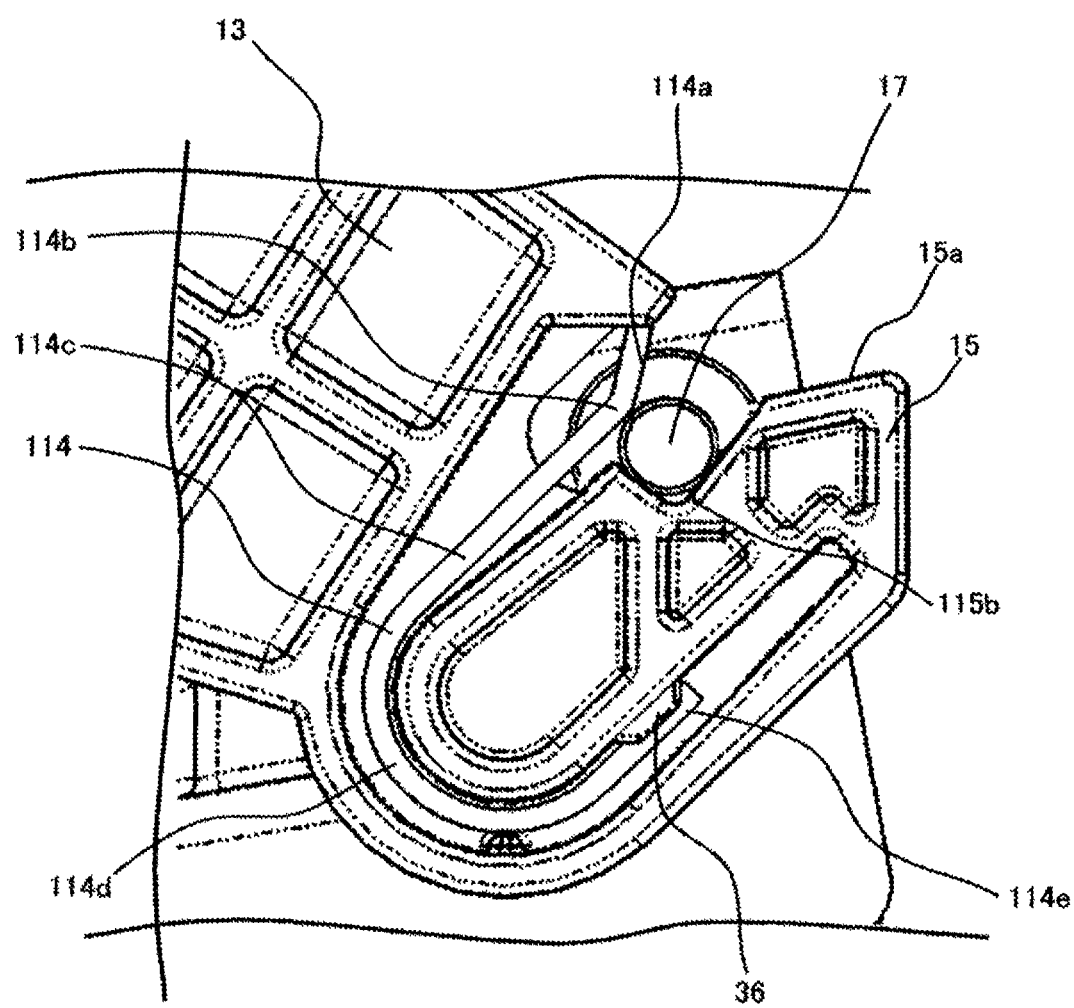
FIG. 11 is an enlarged side view of an area in the vicinity of a receiving portion of a bracket of an in-vehicle image capturing device according to Embodiment 3 of the present invention.

FIG. 11 is an enlarged side view of an area in the vicinity of a receiving portion of a bracket of an in-vehicle image capturing device according to Embodiment 3 of the present invention.

The present embodiment is the same as Embodiment 1 or except for a configuration described with reference to FIG. 11, and thus a description thereof will be omitted.

In FIG. 11, a leaf spring 114 which is the same as that of Embodiment 2 is provided instead of the leaf spring of Embodiment 1. In other words, in the present embodiment, the one end of the leaf spring 114 is in contact with a shaft portion 17, and the other end of the leaf spring 114 has a length not long enough to reach an extension connecting a contact point between the leaf spring 114 and the shaft portion 17, and the center of the shaft portion 17 to each other. In this case, a moment is produced due to a positional relation between a contact position of the one end of the leaf spring 114 and a contact position of the other end of the leaf spring 114 in some cases. Accordingly, in the present embodiment, an abutting portion 115*b* is provided instead of the abutting portion 15*b*. In the abutting portion 115*b*, an angle between two surfaces abutting on the shaft portion 17 is different from that of the abutting portion 15*b*, and can be adjusted to make a force from the shaft portion 17 be applied to the two abutting surfaces equivalently by adjusting the angle between two surfaces abutting on the shaft portion 17.

In the example of FIG. 11, the abutting portion 115*b* consists of two surfaces at a substantially right angle, and an intersecting point between the two surfaces is positioned on a line connecting the center of the shaft portion 17 and an end portion of a linear portion 114*e* to each other. An angle of a surface may be determined so that a loss is not caused, according to a manner in which a force is actually applied.

Note that the present invention is not limited to the embodiments described above, but includes various modified examples. For example, the above-described embodiments have been described in detail in order to explain the present invention in an easy-to-understand manner, and the present invention is not necessarily limited to those having all the configurations described.

Further, a part of a configuration of one embodiment can be replaced with a configuration of another embodiment, and the configuration of another embodiment can be added to the configuration of the one embodiment.

In addition, with respect to a part of the configuration of each embodiment, it is possible to add, delete, and replace other configurations.

Further, any combination of the respective elements of the individual embodiments described above is included in the present invention.

Although the present invention is applied to a stereo camera, the present invention may be applied to a monocular image processing camera consisting of a single camera unit.

<Appendix 1>

According to the present invention described above, 1. an in-vehicle image capturing device including:

an image capturing unit (for example, the camera unit including the lens 21, and the in-vehicle camera 11 including two camera units 22) which captures an image; and a holding part (for example, the bracket 13) which includes a shielding section (for example, the lens hood 33) for partially shielding the image capturing unit and holds the image capturing unit, wherein the image capturing unit includes a supported section (for example, the shaft portion 17) which is supported by the holding part, and the holding part includes a guiding section (for example, the guiding surface 14*a* of the leaf spring 14 and the guiding surface 15*a* of the receiving portion 15) for guiding the supported section toward a first direction in which the image capturing unit approaches the shielding section, and a supporting section (for example, the leaf spring 14 and the abutting portion 15*b*) for supporting the supported section and for restricting movement, in the first direction, of the supported section that has been guided by the guiding section, is provided.

Therefore, it is possible to provide an in-vehicle image capturing device which can be mounted on the window glass of the vehicle without involving deterioration in precision of installation.

In other words, it is possible to provide an in-vehicle image capturing device which can maintain precision of mounting of the window glass on the vehicle body even after mounting the in-vehicle camera on the window glass and improve precision of installation of the in-vehicle camera.

Further, at the time of mounting the in-vehicle camera in the vehicle body, it is desired to mount the in-vehicle camera in a time as short as possible, and thus there is a need to simplify a mounting structure itself. According to the present invention, the supported section is guided by the guiding section and supported by the supporting section, thereby holding the image capturing unit. Therefore, it is possible to mount the in-vehicle camera in a simple manner.

Further, according to the present invention, the supported section is guided toward the first direction by the guiding section, such that it is possible to provide a mounting structure which decreases a load applied to the window glass at the time of mounting.

Further, in view of designability, there is a need to devise a way to conceal portions of the mounted in-vehicle camera, other than the lens as much as possible. According to the present invention, the image capturing unit can be partially shielded by the shielding section, such that it is possible to prevent designability from deteriorating.

Further, according to the present invention, 2. the image capturing device according to 1., wherein the supporting section includes an opening portion (for example, the opening portion 15e) which is an opening open toward the guiding section and into which the supported section enters, and a space portion (for example, the space portion 15f) which holds the supported section entering through the opening portion, is provided.

Therefore, the supported section can be guided to the space portion through the opening portion and it is possible to mount the in-vehicle camera in a simple manner.

Further, according to the present invention, 3. the image capturing device according to 1., wherein the supporting section is deformed (for example, deformation of the leaf spring 14) when the supported section passes therethrough and supports the supported section by a restoring force against the deformation, is provided.

Therefore, the force supporting the supported section can be generated by the deformation when the supported section passes through, such that it is possible to support the supported section without an extra force from the outside.

Further, according to the present invention, 4. the image capturing device according to 1., wherein the supporting section includes an elastic body (for example, the leaf spring 14) which generates a force for clamping the supported section, is provided.

Therefore, as the elastic body is used, it is possible to easily generate the force for clamping the supported section.

Further, according to the present invention, 5. the image capturing device according to 1., wherein the supporting section includes an abutting portion on which the supported section abuts, and an elastic body which is formed separately from the abutting portion and faces the abutting portion to clamp the supported section, is provided.

Therefore, as the elastic body is used, it is possible to easily generate the force for clamping the supported section.

As the elastic body and the abutting portion are formed separately from each other, a degree of freedom in designing the elastic body is increased. For example, a leaf spring formed of a metal is used, such that it is possible to clamp the supported section with a desired force (for example, a stronger force).

Further, according to the present invention, 6. the in-vehicle image capturing device according to 4., wherein the elastic body has a cross section with a U-letter shape, is provided.

Therefore, as the elastic body has the cross section with the U-letter shape, it is possible to easily secure the opening into which the supported section enters.

As the elastic body has the cross section with the U-letter shape, it is possible to sandwich and clamp the supported section and the abutting portion by the elastic body.

Further, according to the present invention, 7. the image capturing device according to 1., wherein the first direction is a direction substantially in parallel to a surface (for example, a bond surface 32 which is a surface bonded to the window glass 12) opposite to a surface where the image capturing unit is held among the surfaces of the holding part, is provided.

Therefore, as the supported section is guided toward the first direction by the guiding section, it is possible to provide a mounting structure which decreases a load applied to the window glass at the time of mounting.

According to the present invention, 8. a bracket (for example, the bracket 13) which holds an image capturing unit including a supported section, the bracket including:

a shielding section (for example, the lens hood 33) for partially shielding the image capturing unit;

a guiding section (for example, the guiding surface 14a of the leaf spring 14 and the guiding surface 15a of the receiving portion 15) for guiding the supported section toward a first direction in which the image capturing unit approaches the shielding section; and a supporting section (for example, the leaf spring 14 and the abutting portion 15b) for supporting the supported section and for restricting movement, in the first direction, of the supported section that has been guided by the guiding section, is provided.

Therefore, it is possible to provide a bracket which can mount the in-vehicle camera on the window glass of the vehicle without involving deterioration in precision of installation.

REFERENCE SIGNS LIST 11 in-vehicle camera
12 window glass
13 bracket
14 leaf spring
15 receiving portion
16 image capturing range
17 shaft portion
21 lens
22 camera unit
23 protruding portion
32 bond surface
33 lens hood 34 leaf spring
35 receiving portion
41 vehicle body
43 bond portion
100 in-vehicle image capturing device

The invention claimed is:

1. An in-vehicle image capturing device that is attached to an inside of a window glass of a vehicle and images an object outside the vehicle through the window glass, the in-vehicle image capturing device comprising:
an image capturing unit which captures an image; and
a holding part which includes a shielding section for partially shielding the image capturing unit and which holds the image capturing unit,
wherein the image capturing unit includes a supported section which is supported by the holding part,
the holding part includes a guiding section for guiding the supported section toward a first direction in which the image capturing unit is along the window glass and a supporting section for supporting the supported section and for restricting movement, in the first direction, of the supported section that has been guided by the guiding section, and
the supporting section includes an abutting portion on which the supported section abuts, and an elastic body that presses the supported section against two surfaces of the abutting portion in a second direction that is a direction away from the window glass.

2. The in-vehicle image capturing device according to claim 1, wherein the supporting section includes an opening portion which is an opening open toward the guiding section and into which the supported section enters, and a space portion which holds the supported section entering through the opening portion.

3. The in-vehicle image capturing device according to claim 1, wherein the supporting section is deformed when the supported section passes therethrough and supports the supported section by a restoring force against the deformation.

4. The in-vehicle image capturing device according to claim 1, wherein the elastic body generates a force for clamping the supported section.

5. The in-vehicle image capturing device according to claim 4, wherein the elastic body has a cross section with a U-letter shape.

6. The in-vehicle image capturing device according to claim 4, wherein the guiding section includes a bent portion, and a portion of the elastic body is disposed in a position corresponding to the bent portion.

7. The in-vehicle image capturing device according to claim 4, wherein the abutting portion has a first surface forming an angle of 45 degrees with respect to a linear portion of the elastic body, and a second surface forming an angle of 135 degrees with respect to the linear portion.

8. The in-vehicle image capturing device according to claim 1, wherein the elastic body is formed separately from the abutting portion and faces the abutting portion to clamp the supported section.

9. The in-vehicle image capturing device according to claim 1, wherein the first direction is a direction substantially parallel to a surface opposite to a surface where the image capturing unit is held among the surfaces of the holding part.

10. A bracket which holds an image capturing unit that is attached to an inside of a window glass of a vehicle and images an object outside the vehicle through the window glass, including a supported section, the bracket comprising:
a shielding section for partially shielding the image capturing unit;
a guiding section for guiding the supported section toward a first direction in which the image capturing unit is along the window glass; and
a supporting section for supporting the supported section and for restricting movement, in the first direction, of the supported section that has been guided by the guiding section, the supporting section includes an abutting portion on which the supported section abuts, and an elastic body that presses the supported section against two surfaces of the abutting portion in a second direction that is a direction away from the window glass.

11. The bracket according to claim 10, further comprising at least one receiving portion disposed on an end of the bracket, wherein the elastic body has a cross section with a U-letter shape corresponding with a U-shaped groove of the receiving portion.

* * * * *